US012713406B2

(12) United States Patent
Ahmadian Tehrani et al.

(10) Patent No.: US 12,713,406 B2
(45) Date of Patent: Aug. 18, 2026

(54) CONFIGURATION OF COVERAGE ENHANCEMENT FEATURES IN CELLULAR COMMUNICATION NETWORKS

(71) Applicant: Nokia Technologies Oy, Espoo (FI)

(72) Inventors: Amir Mehdi Ahmadian Tehrani, Munich (DE); Axel Mueller, Massy (FR); Arto Lehti, Massy (FR); Marco Maso, Massy (FR); Esa Tapani Tiirola, Oulu (FI)

(73) Assignee: Nokia Technologies Oy, Espoo (FI)

( * ) Notice: Subject to any disclaimer, the term of this patent is extended or adjusted under 35 U.S.C. 154(b) by 351 days.

(21) Appl. No.: 18/688,612

(22) PCT Filed: Sep. 1, 2021

(86) PCT No.: PCT/EP2021/074131

§ 371 (c)(1),
(2) Date: Mar. 1, 2024

(87) PCT Pub. No.: WO2023/030621

PCT Pub. Date: Mar. 9, 2023

(65) Prior Publication Data

US 2024/0381321 A1 Nov. 14, 2024

(51) Int. Cl.
*H04W 72/02* (2009.01)
*H04W 56/00* (2009.01)
(Continued)

(52) U.S. Cl.
CPC ......... *H04W 72/02* (2013.01); *H04W 56/001* (2013.01); *H04W 74/006* (2013.01); *H04W 76/27* (2018.02); *H04W 88/04* (2013.01)

(58) Field of Classification Search
CPC . H04W 72/02; H04W 56/001; H04W 74/006; H04W 76/27; H04W 88/04; H04W 56/0045
(Continued)

(56) References Cited

U.S. PATENT DOCUMENTS 9,445,378 B2 9/2016 Yi et al.
2011/0103499 A1 5/2011 Cheng et al.
(Continued)

FOREIGN PATENT DOCUMENTS

EP 3496499 A1 6/2019
EP 3026830 B1 12/2019
(Continued)

OTHER PUBLICATIONS

"3rd Generation Partnership Project; Technical Specification Group Radio Access Network; NR; Physical layer procedures for control (Release 16)", 3GPP TS 38.213, V16.6.0, Jun. 2021, pp. 1-187.
(Continued)

*Primary Examiner* — Jae Y Lee
*Assistant Examiner* — Haeshil Jessica Choi
(74) *Attorney, Agent, or Firm* — Barta Jones, PLLC

(57) ABSTRACT

According to an example aspect of the present invention, there is provided a method, comprising, receiving, by a user equipment, a timing advance command from a wireless network node, wherein the timing advance command comprises a timing advance value and the user equipment is in an inactive or idle state, selecting, by the user equipment, a coverage enhancement configuration using the timing advance value and transmitting, by the user equipment, at least one message to the wireless network node using the selected coverage enhancement configuration.

20 Claims, 9 Drawing Sheets

(51) Int. Cl.

| | |
|---|---|
| ***H04W 74/00*** | (2009.01) |
| ***H04W 76/27*** | (2018.01) |
| ***H04W 88/04*** | (2009.01) |

(58) Field of Classification Search
USPC .......................................................... 370/315
See application file for complete search history.

(56) References Cited

U.S. PATENT DOCUMENTS

| | | | | |
|---|---|---|---|---|
| 2019/0306923 | A1* | 10/2019 | Xiong | H04L 27/261 |
| 2020/0314909 | A1 | 10/2020 | Irukulapati et al. | |
| 2021/0266974 | A1 | 8/2021 | Taherzadeh Boroujeni et al. | |
| 2022/0312492 | A1 | 9/2022 | Maso et al. | |
| 2022/0337998 | A1* | 10/2022 | Tian | H04W 80/02 |

FOREIGN PATENT DOCUMENTS

| | | | |
|---|---|---|---|
| WO | 2017/023200 | A1 | 2/2017 |
| WO | 2021/089314 | A1 | 5/2021 |
| WO | 2022/207968 | A1 | 10/2022 |
| WO | 2022/253550 | A1 | 12/2022 |

OTHER PUBLICATIONS

"3rd Generation Partnership Project; Technical Specification Group Radio Access Network; NR; Medium Access Control (MAC) protocol specification (Release 16)", 3GPP TS 38.321, V16.4.0, Mar. 2021, pp. 1-157.

"3rd Generation Partnership Project; Technical Specification Group Radio Access Network; NR; Radio Resource Control (RRC) protocol specification (Release 16)", 3GPP TS 38.331, V16.4.1, Mar. 2021, pp. 1-949.

"New SID: Optimizations of pi/2 BPSK uplink power in NR", 3GPP TSG RAN Meeting #91e, RP-210910, Agenda: 9.1.5, Huawei, Mar. 22-26, 2021, 4 pages.

"Revised WID on NR coverage enhancements", 3GPP TSG RAN meeting #91e, RP-210855, Agenda: 9.7.26, China Telecom, Mar. 16-26, 2021, 5 pages.

"Timing Advance", ShareTechnote, Retrieved on Jun. 26, 2024, Webpage available at : https://www.sharetechnote.com/html/5G/5G_TimingAdvance.html.

"4G/LTE—RACH", ShareTechnote, Retrieved on Jun. 26, 2024, Webpage available at : https://www.sharetechnote.com/html/RACH_LTE.html#RACH_Procedure_for_Initial_Registration.

"3rd Generation Partnership Project; Technical Specification Group Radio Access Network; NR; Physical layer measurements (Release 16)", 3GPP TS 38.215, V16.4.0, Dec. 2020, pp. 1-25.

"On spectrum shaping for uplink Pi/2 BPSK with DFT-S-OFDM", 3GPP TSG-RAN WG1#89, R1-1709002, Agenda: 7.1.5, Nokia, May 15-19, 2017, 3 pages.

"Further Link Results for p/2 BPSK DFT-S-OFDM Waveform with Spectrum", 3GPP TSG RAN WG4 Meeting #85, R4-1714191, Agenda: 9.4.3.2, IITH, Nov. 27-Dec. 1, 2017, 4 pages.

"Performance evaluation for pi/2 BPSK with FDSS", 3GPP TSG RAN WG1 Meeting #88bis, R1-1705060, Agenda: 8.1.10, Huawei, Apr. 3-7, 2017, 8 pages.

"On the detection performance of pi/2-BPSK DFT-s-OFDM with transparent shaping", 3GPP TSG-RAN WG4 Meeting #84bis, R4-1710213, Agenda: 9.4.3.10, Huawei, Oct. 9-13, 2017, 4 pages.

"DFT-Spread OFDM with Pulse Shaping Filter in Frequency Domain in Evolved UTRA Uplink", 3GPP TSG RAN WG1 #42 on LTE, R1-050702, Agenda: 10.3, NTT DoComo, Aug. 29-Sep. 2, 2005, pp. 1-8.

U.S. Appl. No. 63/169,455, "Methods and Apparatuses for Triggering and/Or Configuring Message Repetitions", filed Apr. 1, 2021, pp. 1-43.

"Random access for Rel-13 low complexity and coverage enhanced UEs", 3GPP TSG-RAN WG2 #90, R2-152649, Agenda: 7.4.4, Ericsson, May 25-29, 2015, pp. 1-7.

International Search Report and Written Opinion received for corresponding Patent Cooperation Treaty Application No. PCT/EP2021/074131, dated May 23, 2022, 16 pages.

* cited by examiner

CONFIGURATION OF COVERAGE ENHANCEMENT FEATURES IN CELLULAR COMMUNICATION NETWORKS

FIELD

Various example embodiments relate in general to cellular communication networks and more specifically, to configuration of coverage enhancement features in such networks.

BACKGROUND

Coverage enhancement features may be exploited at least in various cellular networks, such as, networks operating according to Long Term Evolution, LTE, and/or 5G radio access technology. 5G radio access technology may also be referred to as New Radio, NR, access technology. 3rd Generation Partnership Project, 3GPP, still develops LTE and also standards for 5G/NR. Some topics in the 3GPP discussions are related to coverage enhancements. According to the discussions there is a need to provide enhanced methods, apparatuses and computer programs related to coverage enhancements in cellular communication networks.

SUMMARY

According to some aspects, there is provided the subject-matter of the independent claims. Some embodiments are defined in the dependent claims.

The scope of protection sought for various embodiments of the invention is set out by the independent claims. The embodiments and features, if any, described in this specification that do not fall under the scope of the independent claims are to be interpreted as examples useful for understanding various embodiments of the invention.

According to a first aspect, there is provided a method comprising, receiving, by a user equipment, a timing advance command from a wireless network node, wherein the timing advance command comprises a timing advance value and the user equipment is in an inactive or idle state, selecting, by the user equipment, a coverage enhancement configuration using the timing advance value and transmitting, by the user equipment, at least one message to the wireless network node using the selected coverage enhancement configuration.

Embodiments of the first aspect may comprise at least one feature from the following bulleted list:

- selecting, by the user equipment, the coverage enhancement configuration by comparing the timing advance value to at least one threshold;
- the at least one threshold is received via higher layer signaling;
- the timing advance value indicates one coverage enhancement configuration from at least two coverage enhancement configurations;
- the coverage enhancement configuration comprises a spectrum shaping factor and/or a transmission repetition number;
- the timing advance command is received in a random access response message responsive to transmitting a first random access request message of a random access procedure and the at least one message comprises a second random access request message of the random access procedure;
- the random access response message comprises a frequency domain resource allocation and/or a time domain resource allocation and a resource allocation extension is determined based on the timing advance value and a mapping table;
- selecting, by the user equipment, one timing advance value range to which the timing advance value belongs to by comparing the timing advance value to at least one threshold and determining the coverage enhancement configuration associated with the selected timing advance value range;
- the coverage enhancement configuration is selected from at least two coverage enhancement configurations and each coverage enhancement configuration comprises a different spectrum shaping factor and/or a different transmission repetition number compared to other coverage enhancement configurations;
- determining, by the user equipment, a mapping table comprising at least two timing advance value ranges, wherein each timing advance value range is associated with a different coverage enhancement configuration in the mapping table, selecting, by the user equipment, one of the at least two timing advance value ranges to which the timing advance value belongs to and selecting, by the user equipment, the coverage enhancement configuration associated with the selected timing advance value range;
- information about at least one timing advance value range and/or at least one coverage enhancement configuration is received via higher layer signaling.

According to a second aspect, there is provided a method comprising determining, by a wireless network node, a timing advance value for a user equipment, wherein the user equipment is in an inactive or idle state, selecting, by the wireless network node, a coverage enhancement configuration for the user equipment using the timing advance value, transmitting, by the wireless network node, a timing advance command to the user equipment, wherein the timing advance command comprises the timing advance value and receiving, by the wireless network node, at least one message from the user equipment according to the selected coverage enhancement configuration.

Embodiments of the second aspect may comprise at least one feature from the following bulleted list:

- selecting, by the wireless network node, the coverage enhancement configuration by comparing the timing advance value to at least one threshold;
- the at least one threshold is transmitted via higher layer signaling;
- scheduling, by the wireless network node, resources for the user equipment according to the coverage enhancement configuration and transmitting, by the wireless network node, an indication about the scheduled resources to the user equipment;
- the timing advance value indicates one coverage enhancement configuration from at least two coverage enhancement configurations;
- the coverage enhancement configuration comprises a spectrum shaping factor and/or a transmission repetition number;
- the timing advance command is transmitted in a random access response message responsive to receiving a first random access request message of a random access procedure and the at least one message comprises a second random access request message of the random access procedure;
- the random access response message comprises a frequency domain resource allocation and/or a time domain resource allocation and a resource allocation extension is determined based on the timing advance value and a mapping table;

selecting, by the wireless network node, a timing advance value range to which the timing advance value belongs to by comparing the timing advance value to at least one threshold and determining, by the wireless network node, the coverage enhancement configuration associated with the selected timing advance value range;

the coverage enhancement configuration is determined from at least two coverage enhancement configurations and each of the coverage enhancement configurations comprises a different spectrum shaping factor and/or a different transmission repetition number compared to other coverage enhancement configurations;

determining, by the wireless network node, a mapping table comprising at least two timing advance value ranges, wherein each timing advance value range is associated with a different coverage enhancement configuration in the mapping table, selecting, by the wireless network node, one of the at least two timing advance value ranges to which the timing advance command belongs to and selecting, by the wireless network node, the coverage enhancement configuration associated with the selected timing advance value range.

information about at least one timing advance value range and/or at least one coverage enhancement configuration is transmitted via higher layer signaling.

According to a third aspect of the present invention, there is provided an apparatus, such as a user equipment or a control device configured to control the user equipment, comprising at least one processing core, at least one memory including computer program code, the at least one memory and the computer program code being configured to, with the at least one processing core, cause the apparatus at least to receive a timing advance command from a wireless network node, wherein the timing advance command comprises a timing advance value and the user equipment is in an inactive or idle state, select a coverage enhancement configuration using the timing advance value and transmit at least one message to the wireless network node using the selected coverage enhancement configuration. The at least one memory and the computer program code may be further configured to, with the at least one processing core, cause the apparatus at least to perform the method of the first aspect.

According to a fourth aspect of the present invention, there is provided an apparatus, such as a wireless network node or a control device configured to control the wireless network node, comprising at least one processing core, at least one memory including computer program code, the at least one memory and the computer program code being configured to, with the at least one processing core, cause the apparatus at least to determine a timing advance value for a user equipment, wherein the user equipment is in an inactive or idle state, select a coverage enhancement configuration for the user equipment using the timing advance value, transmit a timing advance command to the user equipment, wherein the timing advance command comprises the timing advance value and receive at least one message from the user equipment according to the selected coverage enhancement configuration. The at least one memory and the computer program code may be further configured to, with the at least one processing core, cause the apparatus at least to perform the method of the second aspect.

According to a fifth aspect of the present invention, there is provided an apparatus, such as a user equipment or a control device configured to control the user equipment, comprising means for receiving a timing advance command from a wireless network node, wherein the timing advance command comprises a timing advance value and the user equipment is in an inactive or idle state, means for selecting a coverage enhancement configuration using the timing advance value and means for transmitting at least one message to the wireless network node using the selected coverage enhancement configuration. The apparatus may further comprise means for performing the method of the first aspect.

According to a sixth aspect of the present invention, there is provided an apparatus, such as a wireless network node or a control device configured to control the wireless network node, comprising means for determining a timing advance value for a user equipment, wherein the user equipment is in an inactive or idle state, means for selecting a coverage enhancement configuration for the user equipment using the timing advance value, means for transmitting a timing advance command to the user equipment, wherein the timing advance command comprises the timing advance value and means for receiving at least one message from the user equipment according to the selected coverage enhancement configuration. The apparatus may further comprise means for performing the method of the second aspect.

According to a seventh aspect of the present invention, there is provided non-transitory computer readable medium having stored thereon a set of computer readable instructions that, when executed by at least one processor, cause an apparatus to at least perform the method of the first or the second aspect. According to an eighth aspect of the present invention, there is provided a computer program comprising instructions which, when the program is executed by an apparatus, cause the apparatus to carry out the method of the first or the second aspect.

EMBODIMENTS

Use of Coverage Enhancement, CE, features may be improved in cellular communication networks by the procedures described herein. In general, at least for User Equipments, UEs, in Radio Resource Control, RRC, inactive and idle states it would be beneficial to configure dynamically CE feature(s), such as repetition and/or spectrum shaping, to enable optimal allocation of resources. Embodiments of the present invention therefore make it possible for a wireless network node, such as a Base Station, BS, to configure CE feature(s) of a UE, e.g., during a Random Access, RA, procedure. The CE configuration may be determined without additional signalling, for example based on a Timing Advance, TA, value of a Timing Advance Command, TAC, which is particularly useful because the TAC may be transmitted always during the RA procedure. Alternatively, or in addition, the CE configuration may be determined based on an estimated Path Loss, PL. Thus, in general, the CE configuration, such as a transmission repetition number (or simply repetition) and/or a spectral shaping factor (which may be used to perform spectrum shaping), may be determined based on one or more parameters. Particularly, said one or more parameters may be affected by environment of associated devices, such as the UE. Two examples of said one or more parameters may be propagation delay, which can be indicated e.g. with TA value of TAC, and PL. Thus, it can be understood that the one or more parameters may be affected by radio conditions and/or environment. For example, distance between UE and BS may influence TA and/or PL. In some examples, it may thus be possible to determine the CE configuration based on both TA and PL.

Figure 1:
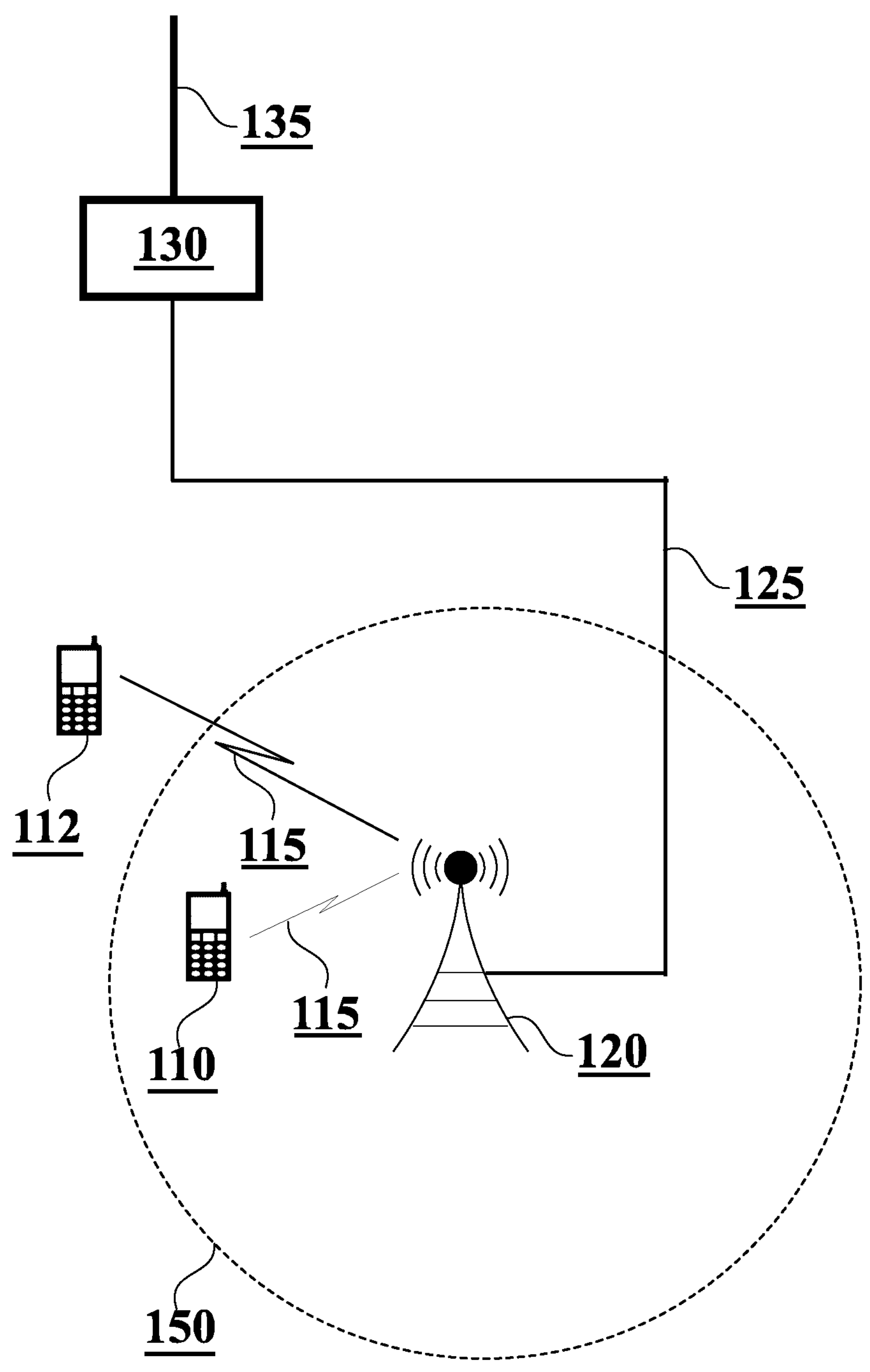
FIG. 1 illustrates an example of a network scenario in accordance with at least some embodiments.

FIG. 1 illustrates an example of a network scenario in accordance with at least some example embodiments. According to the example scenario of FIG. 1, there may be a cellular communication network comprising UE 110, and possibly UE 112 as well, at least one BS 120 and core network element 130. In the example network of FIG. 1, at least UE 110 may communicate wirelessly with BS 120, or with a cell of BS 120, via air interface 115. In some example embodiments, UE 112 may also communicate wirelessly with BS 120, or with a cell of BS 120, via air interface 115.

UEs 110 and 112 may be referred to as CE UEs, wherein a CE UE refers to a UE benefiting from granting additional resources by BS 120, e.g., during initial access. In some embodiments though, UE 112 may be referred to as a legacy UE, wherein a legacy UE refers to a UE not benefiting from granting additional resources by BS 120, e.g., during initial access. In some embodiments though, UE 112 may be referred to as a legacy UE, without CE capability. BS 120 may be considered as a serving Base Station, BS, for CE UE 110. Even though BS 120 is used as an example, any wireless network node in general, such as a relay, may perform at least some of the tasks of BS 120.

Threshold for CE configuration is depicted by 150. Threshold 150 may be a threshold which defines which UEs would need to use, or benefit of using, CE feature(s). That is, it may not be beneficial to activate CE feature(s) for CE UE 110, because CE UE 110, is within threshold 150, but it may be beneficial to activate CE feature(s) for CE UE 112. Threshold 150 may be for example a certain TA or PL value. For instance, a TA value of CE UE 110 may be below threshold 150.

UEs 110, 112 may comprise, for example, a smartphone, a cellular phone, a Machine-to-Machine, M2M, node, Machine-Type Communications node, MTC, an Internet of Things, IoT, node, a D2D node, a car telemetry unit, a laptop computer, a tablet computer or, indeed, any kind of suitable wireless terminal, station, or a relay. Air interface 115 may be configured in accordance with a Radio Access Technology, RAT, which UEs 110, 112 and BS 120 are configured to support. Examples of cellular RATs include Long Term Evolution, LTE, New Radio, NR, which may also be known as fifth generation, 5G, radio access technology and MulteFire. For example, in the context of LTE, BS 120 may be referred to as eNB while BS 120 may be referred to as gNB in the context of NR. In any case, example embodiments are not restricted to any particular wireless technology. Instead, example embodiments may be exploited in any cellular communication network wherein coverage enhancements are used.

BS 120 may be connected, directly or via at least one intermediate node, with core network 130 via interface 125. Core network 130 may be, in turn, coupled via interface 135 with another network (not shown in FIG. 1), via which connectivity to further networks may be obtained, for example via a worldwide interconnection network. BS 120 may be connected with at least one other BS as well via an inter-base station interface (not shown in FIG. 1), even though in some example embodiments the inter-base station interface may be absent. BS 120 may be connected, directly or via at least one intermediate node, with core network 130 or with another core network.

In some embodiments, the network scenario may comprise a relay node instead of, or in addition to, UE 110 and/or BS 120. Relaying may be used for example when operating on millimeter-wave frequencies. One example of the relay node may be an Integrated Access and Backhaul, IAB, node. The IAB node may be referred to as a self-backhauling relay as well. Another example of a relay may be an out-band relay. In general, the relay node may comprise two parts:

1) Distributed Unit, DU, part which may facilitate functionalities of BS 120, such as a gNB. Thus, in some example embodiments, the DU part of a relay may be referred to as BS 120 and the DU may perform tasks of BS 120;
2) Mobile Termination, MT, part which may facilitate functionalities of UE 110, i.e., a backhaul link which may be the communication link between a parent node (DU), such as a DU part of BS 120, and the relay, such as an IAB node. In some example embodiments, the MT part may be referred to as UE 110 and perform tasks of UE 110.

Embodiments of the present invention improve the use of CE feature(s), such as repetition of transmissions and spectrum shaping (e.g., Frequency Domain Spectrum Shaping, FDSS, with or without spectrum extension). For example for RA Msg3, uplink resource overhead may be reduced. In several practical scenarios uplink resources could not be optimally allocated without improvements. For instance, if CE UE 110 is located close to BS 120, as shown in FIG. 1, CE UE 110 would not require spectrum extension to be activated. Thus, any allocated resources for spectrum extension would be wasted in this case. Embodiments of the present invention therefore enable configuration of CE feature(s) only for CE UEs which benefit from the use of CE feature(s). Such CE UEs may be configured in the cell via broadcast signalling without a need for additional signalling dedicated to each UE.

Figure 2:
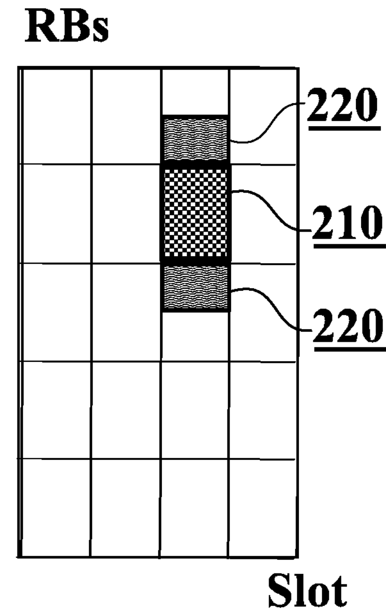
FIG. 2 illustrates an example of resource allocation with fixed size in accordance with at least some embodiments.

FIG. 2 illustrates an example of resource allocation with fixed size in accordance with at least some embodiments. More specifically, FIG. 2 illustrates a resource allocation of CE UE 110, wherein necessary resources are denoted by 210 and wasted resources are denoted by 220. Wasted resources 220 may refer to resources which would be allocated for CE UE 110 because BS 120 does not know that UE 110 is close to it. That is, BS 120 may allocate resources using spectrum extension for CE, even though CE would not be needed when CE UE 110 is in the proximity of BS 120, thereby causing waste of resources 220.

The reason for this problem is that currently no solution exists to determine whether CE features should be configured for CE UE 110 by BS 120, e.g., during RA when CE UE 110 is in inactive or idle state. So if BS 120 wants to ensure good coverage, e.g., for transmission of a second RA request, like Msg3, during RA procedure, BS 120 would need to allocate maximum amount of resources for CE UE 110 using CE features, without risking interference to other users. Hence additional, always-on, overhead may be a a problem as well.

At least the following challenges may be associated with resource allocation of CE features, at least for resource allocation of RA Msg3:

- CE for RA Msg3 requires specific arrangements, since UE-specific RRC connection is not yet available at the time when transmitting RA messages;
- Both legacy UE 112 not supporting CE, like Msg3 repetition and/or spectrum shaping, and CE UE 110 supporting CE may be present in the same cell and should be considered;
- Potential presence of legacy UE 112 that is not capable of performing CE must always be considered;
- A cell edge CE UE suffering potentially from coverage problem and a cell center CE UE having no coverage problem may be present in the same cell and should be considered;
- Signalling support for, e.g., 3GPP Rel-15 and Rel-16 solutions, targeting CE does not exist in currently standardized specifications, since such solutions support only operations which are transparent to the network, e.g. to BS 120;
- Coverage situation depends heavily on the deployment scenario, e.g., whether the operation frequency is on Frequency Range 1, FR1, or FR2, whether there are small cells or large cells, as well as UE capabilities which may not be known in RRC inactive or idle state;
- Number of resources, such as Physical Resource Blocks, PRBs, available for RA Msg3 may vary according to cell loading situation;
- UE may not necessarily know all parameters which regulate how CE features are configured and used, e.g., maximum spectral extension factor;
- BS 120 may not know all the physical parameters which could impact configuration of CE features, such as measured PL at CE UE 110;
- Most UE capabilities may not be known at BS 120 when Msg3 transmission is scheduled/triggered.

Therefore, there is a need to define a solution to trigger and/or configure CE features at least during random access, like Type A or Msg3 repetitions and/or different modes of spectral shaping in NR, which scales to different scenarios for example based on the environment. For instance, the number of repetitions and/or spectral shaping factor should be defined in a UE-specific manner and not in a cell-specific manner, to ensure that repetitions and/or spectral shaping may be used only when needed. The number of repetitions of transmissions may be referred to as a transmission repetition number as well. Transmission repetition number may indicate how many times a given message, such as Msg3, should be repeated.

Embodiments of the present invention therefore provide means for BS 120 to signal to CE UE 110 a configuration of CE feature(s) for example during RA procedure. For instance, BS 120 may signal to CE UE 110 a configuration about how much spectrum extension to apply, if any. Alternatively, or in addition BS 120 may signal the configuration of CE feature(s) for all CE UEs or a group of CE UEs. In such a case, the same TA value or the PL may be assumed.

BS 120 may perform environment-based configuration, e.g., for the second RA request message, like Msg3, of CE UE 110 with spectrum shaping. The configuration may be determined before BS 120 transmits a RA response, like Msg2, i.e., prior to scheduling resources for transmission of the second RA request message and the configuration may be taken into account when said scheduling resources. The environment-based configuration may be based on at least one of the following two alternatives, which may be used in conjunction, if needed/possible:

- BS 120 may estimate a propagation delay between CE UE 110 and BS 120 upon reception of a first RA request message, like Msg1, from CE UE 110 and the propagation delay may be delivered to CE UE 110 using a TA value of a TAC in Msg2, i.e., in the RA response transmitted to CE UE 110 by BS 120;
- BS 120 may perform PL measurements upon reception of the first RA message from CE UE 110, e.g., by measuring a Reference Signal Received Power, RSRP, of the received signal. The PL measured at BS 120 may not be known at CE UE 110 but can be mapped into "usable information" by CE UE 110 using a PL measured during Synchronization Signal Block, SSB, reception at CE UE 110.

The TA value and/or PL may be used to establish a shared knowledge between CE UE 110 and BS 120, as the TA value and/or PL may be exploited to estimate a distance between CE UE 110 and BS 120. The TA value and/or PL may be compared to a threshold by CE UE 110 and BS 120, and CE UE 110 and BS 120 may independently identify the exact CE configuration, i.e., how much enhancement of the UE coverage is required, per coverage challenge event. The exact CE configuration may be determined without the need for an established communication channel, i.e., without or before moving CE UE 110 to RRC connected state. That is, no communication channel is used to exchange the measurement values, like propagation delay and PL, itself on the fly. In some embodiments, the shared knowledge may be achieved by means of one or more threshold values configured using System Information Block 1, SIB1, as well as one or more shared parameter values, like the TA value or the PL, known or estimated by both CE UE 110 and BS 120. Thus, BS 120 may schedule resources, e.g., for RA Msg3 with spectrum shaping, to CE UE 110 based on the value(s) known at both, CE UE 110 and BS 120.

It should also be noted that even though spectrum shaping, and Type A Msg3 repetitions are used here as an example, embodiments of the present invention may be applied for other CE feature(s) and methods as well.

Figure 3:
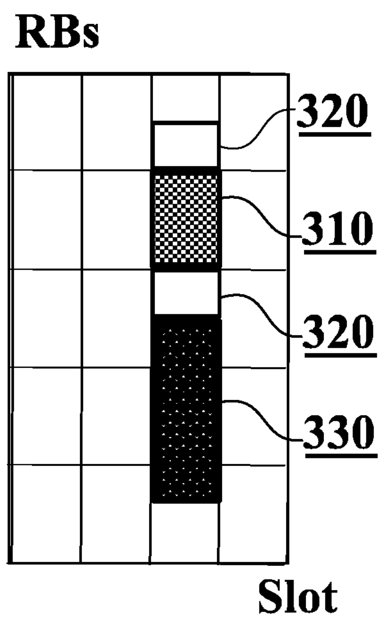
FIG. 3 illustrates a first example of scalable (non-fixed) resource allocation in accordance with at least some embodiments.

FIG. 3 illustrates a first example of scalable (non-fixed size) resource allocation in accordance with at least some embodiments. In FIG. 3, a resource allocation of CE UE 110 is denoted by 310, saved resources are denoted by 320 and resource allocation of UE 112 is denoted by 330. FIG. 3 illustrates an example, wherein spectrum shaping is used for CE.

In the example of FIG. 3, UE 112 is a CE UE and the used CE feature is spectrum shaping with extension for CE UE 110 and CE UE 112. The spectrum shaping configurations may be based on environment-based thresholds broadcasted by BS 120, e.g., via higher-layer signalling, or determined from a standard specification, like a 3GPP standard specification, with respect to the shared knowledge, such as the TA value and/or PL. As shown in FIG. 1, CE UE 110 may be close to BS 120 while CE UE 112 may be far away from BS 120. For instance, CE UE 112 may be at an edge of a cell of BS 120.

In case of CE UE 110 the TA value and/or PL may be smaller than the threshold (threshold 150) while in case of CE UE 112 the TA value and/or PL may be larger than the threshold. Hence, CE UE 110 may be configured with a smaller spectral shaping factor (or w/o spectrum extension) while CE UE 112 may be configured with a larger spectral shaping factor (or with spectrum extension in general or spectrum shaping (without extension) in general). For instance, in case of symmetric extension, the resource allocation, $N_{tx}$, may be extended by α such that the extended resource allocation becomes (1+α) $N_{tx}$.

As shown in FIG. 3, the spectrum allocation (RBs) of CE UE 110 is smaller than the spectrum allocation of CE UE 112. Therefore, resource overhead may be reduced and unnecessary resources, i.e., saved resources 320, for spectrum extension may not be scheduled for CE UE 110 by BS 120. At the same time, BS 120 may schedule additional resources for CE UE 112 to fulfil a need of CE UE 112 for CE.

Figure 4:
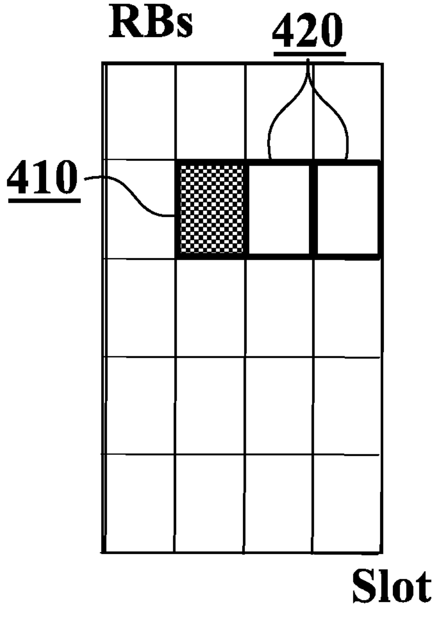
FIG. 4 illustrates a second example of scalable resource allocation in accordance with at least some embodiments.

FIG. 4 illustrates a second example of resource allocation with fixed size in accordance with at least some embodiments. In FIG. 4, a resource allocation of CE UE 110 is denoted by 410 and saved resources are denoted by 420. FIG. 4 illustrates an example, wherein repetition of transmission in time domain (n 3) may be used for CE.

If BS 120 determines that no coverage of shortage is expected for CE UE 110, BS 120 may decide to schedule resource 410 for CE UE 110 only, and not to schedule resources 420 for CE UE 110. In such a case, BS 120 may need to know that CE UE 110 is close to BS 120. As such, BS 120 may not need to schedule all resources 410 and 420 for CE UE 110 if the CE configuration possibility is not enabled. Also, BS 120 may need to schedule all resources 410 and 420 if BS 120 does not know which CE UEs are close to it or which UEs are CE UEs.

Figure 5:
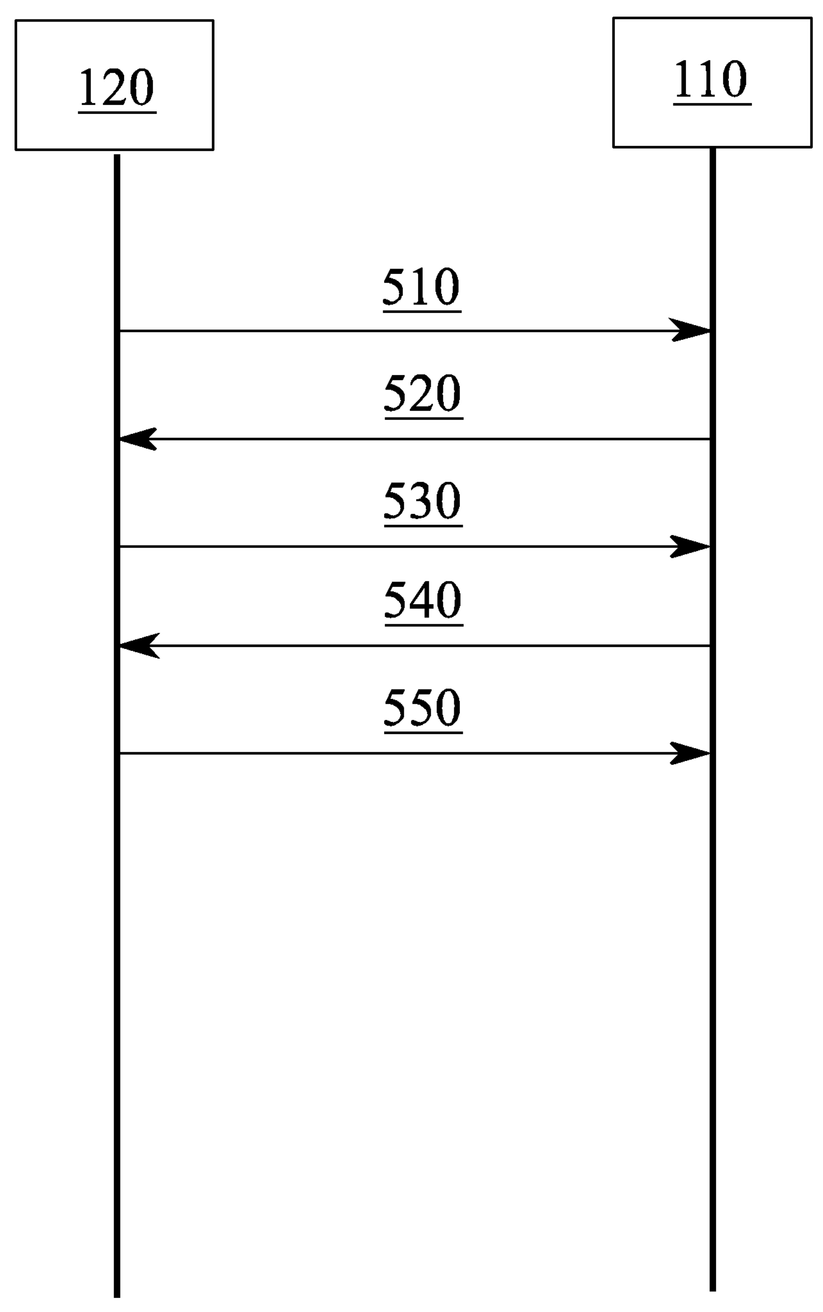
FIG. 5 illustrates a first signaling graph in accordance with at least some embodiments.

FIG. 5 illustrates a first signaling graph in accordance with at least some embodiments. With reference to FIG. 1, on the vertical axes are disposed, from the left to the right, BS 120 and UE 110. Time proceeds from the top towards the bottom. FIG. 5 illustrates an example, wherein the CE configuration is based on a timing offset, i.e., the TA value. The timing offset-based configuration may be for example for transmission of the second RA request message, like Msg3, using spectral shaping factors and/or number of Type A repetitions for CE UE 110. BS 120 may for example choose a spectral shaping factor for CE UE 110 based on the shared knowledge between CE UE 110 and BS 120, i.e., the TA value of CE UE 110. In some embodiments, BS 120 may set one or more thresholds related to the TA value, for selection of the CE configuration for transmission of the second RA request message based on the TA value. CE UE 110 may receive the TA value in a TAC of a RA response from BS 120 and then map the TA value to a suitable CE feature configuration depending, for example, on a pre-existing mapping table. The mapping table may be communicated via higher-layer signaling from BS 120 or defined in a standard specification.

At step 510, BS 120 may broadcast a message comprising a mapping table for determination of the CE configuration based on a TA value by CE UE 110. For instance, BS 120 may broadcast a mapping table which comprises thresholds related to the CE configuration, like spectral shaping factor and/or number of repetitions with respect to the TA value. CE UE 110 may receive the message and decode it to determine the mapping table. In some embodiments, CE UE 110 may store the mapping table to its memory. In some embodiments, step 510 is not needed, if for example the mapping table is hard-coded in a standard specification.

The message may be broadcasted via higher layer signaling (e.g., SIB1 a.k.a. Remaining Minimum System Information, RMSI). Examples of the TA value mapping table are shown in Tables 1 and 2, which show TA value ranges and corresponding spectral shaping factors. Alternatively, or in addition, the mapping table may comprise TA value ranges and corresponding number of repetitions. Hence, the mapping table may comprise at least two TA value ranges, wherein each TA value range may be associated with a different CE configuration. The TA value range may be defined in different formats, e.g., in time such as nanoseconds or in terms of number of time units, $T_c$, such as $T_c$=0.509 ns. In some embodiments, the right-hand column (CE conf.) may be hard-coded in a standard specification and BS 120 may configure the TA value ranges of the left-hand column via higher layer signaling, such as SIB1.

TABLE 1

A first example of a TA value mapping table

| TA value ranges | CE conf. (SS Factor) |
|---|---|
| TA value < 1100 | No shaping factor |
| TA value > 1100 | shaping factor with 25% extension |

TABLE 2

A second example of a TA value mapping table

| TA value ranges | CE conf. (SS Factor) |
|---|---|
| TA value < 1000 | $S_1$ |
| 1000 < TA value < 1200 | $S_2$ |
| TA value > 1200 | $S_3$ |

As shown in Tables 1 and 2, one TA value, within a certain TA value range, may indicate one CE configuration, such as Spectral Shaping, SS, factor, from at least two CE configurations. That is, one TA value range may be associated with one CE configuration, e.g., by being on the same row in the mapping table. One CE configuration may comprise a SS factor and/or a number of repetitions of transmissions. In Table 1, the threshold is 1100 (or 0.56 us considering $T_c$=0.509 ns as time unit) while in Table 2 a first threshold is 1000 and a second threshold is 1200. In some embodiments, the at least one threshold, information about the TA value ranges ((e.g., TA value≤1000, 1000<TA value≤1200. TA value>1200) and/or information about at least one CE configuration (e.g., $S_1$, $S_2$, $S_3$) may be transmitted via higher layer signaling, such as Physical Broadcast Channel, PBCH, or SIB1, or some other SIB.

In some embodiments, SS factor may refer to spectral extension factor. However, SS factor may cover other cases as well. SS factors may comprise for example "No shaping (and hence no extension) and shaping without extension", "No shaping and shaping with extension", "Shaping without extension and shaping with extension" and "Shaping with small extension and shaping with large extension". For example, a certain SS factor associated or mapped with a certain TA or PL value (or other similar value as discussed herein) may indicate that no shaping is to be used. A different SS factor may indicate that shaping without extension should be used. A different SS factor may indicate that shaping with extension should be used. A different SS factor may indicate that shaping with a certain size of extension should be used. For example, small and/or large size of extension can be utilized. It may not be necessary that all these different SS factors and associated actions are to be used, and thus one or more of the described SS factors and associated actions may be utilized. As said, the different SS factors may each be associated with a certain level of TA or PL value, for example.

It should be noted that in Tables 1 and 2, it is assumed that resource utilization increases with S-indices, in turn extending the range of the transmission. In this example, $S_1$ may result in lowest spectral extension possible, i.e., take the least amount of resources, and thus in the smallest range increase (out of the 3 possible values in this example). This is consistent with, for example, letting S-indices be mapped to different spectral shaping filter coefficient sets.

At step 520, CE UE 110 may transmit a first RA request message of a RA procedure, such as Msg1, to BS 120. CE UE 110 may select a suitable preamble for the transmission of the first RA request message. The first RA request message may comprise a Random Access Channel, RACH, preamble for example. The transmission of the first RA request message may take place independently of the mapping table. That is, the mapping table may not affect the transmission of the first RA request message.

Upon reception of the first RA message, BS 120 may prepare and schedule necessary resources in time and/or frequency for transmission of a second RA request message, such as Msg3, by CE UE 110. BS 120 may prepare and schedule said necessary resources for usage of CE feature(s), e.g., repetition and/or spectrum shaping with extension if UE 110 supports CE. If UE 110 does not support CE, BS 120 may not prepare and schedule resources for usage of CE feature(s).

BS 120 may select a CE configuration for CE UE 110 using a TA value of CE UE 110. The CE configuration of CE UE 110 may be determined using Table 1 or 2 for example, by selecting one TA value range to which the TA value belongs to by comparing the TA value to at least one threshold. The TA value of CE UE 110 may be determined based on a propagation delay of the received first RA message for example. After that, BS 120 may schedule resources for CE UE 110 according to the selected CE configuration, for transmission of a second RA request message (e.g. Msg3) of the RA procedure. In some embodiments, BS 120 may consider TA value(s) for CE UEs also when allocating resources for other UEs, e.g., if there are no CE UEs requiring spectrum extension or repetition, those (additional) resources are available for other UEs.

At step 530, BS 120 may transmit a RA response message of the RA procedure, such as Msg2, to CE UE 110. The RA response message may comprise a TAC and the TAC may further comprise the TA value. In some embodiments, BS 120 may also transmit an indication about the scheduled resources. For example, the scheduled resources may contain frequency domain resource allocation, and time domain resource allocation. The actual resource allocation signalling may be the same for both CE and legacy (non-CE) UEs. Usage of additional resources in time domain or frequency domain may be selected based on the TA value and the mapping table, thereby making it possible to keep the RA response message unchanged.

Upon receiving the TA value, CE UE 110 may compare it to the mapping table and select a CE configuration using the TA value. CE UE 110 may select a TA value range to which the TA value belongs to by comparing the TA value to at least one threshold, shown in Tables 1 and 2 for example. CE UE 110 may then determine the CE resource configuration in frequency domain associated with the selected TA value range. For instance, if the TA value is 1150, CE UE 110 may select shaping factor with 25% extension if Table 1 is used. On the other hand, CE UE 110 may select $S_2$ if the TA value is 1150 and Table 2 is used. BS 120 may have selected the CE configuration in the same way. Thus, the CE configuration of CE UE 110 may be selected using the TA value of UE 110.

At step 540, CE UE 110 may transmit the second RA request message of the RA procedure, such as Msg3, to BS 120 using the selected CE configuration. The second RA request message may be a RRC connection request. In an example, transmission of the second RA request message using the selected CE configuration may mean repeating the second RA request message according to the transmission repetition number. In an example, transmission of the second RA request message using the selected CE configuration may mean transmitting the second RA request message according to the spectral shaping factor. In a further example, transmission of the second RA request message using the selected CE configuration may mean repeating the second RA request message according to the transmission repetition number and/or transmitting according to the spectral shaping factor. For example, if the transmission repetition number is 4, UE 110 would transmit the second RA request message five times altogether, e.g., via five consecutive uplink slots. In some embodiments, a transmission number may be used instead of the transmission repetition number, wherein the transmission repetition number is one less than the transmission number.

Responsive to receiving the second RA request message, BS 120 may transmit, at step 550, a contention resolution message of the RA procedure to CE UE 110.

Figure 6:
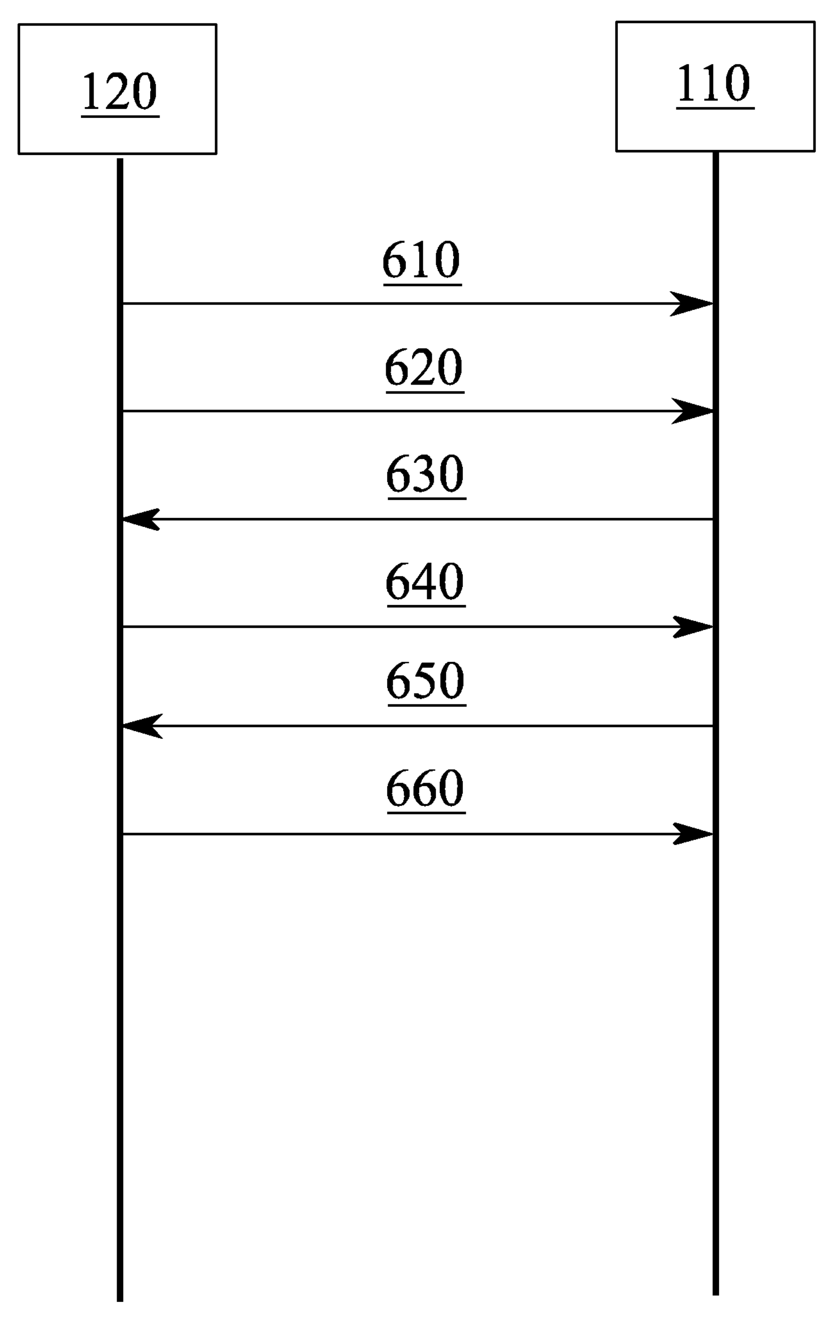
FIG. 6 illustrates a second signaling graph in accordance with at least some embodiments.

FIG. 6 illustrates a second signaling graph in accordance with at least some embodiments. Similarly as in FIG. 5, on the vertical axes are disposed, from the left to the right, BS 120 and UE 110. Time proceeds from the top towards the bottom. FIG. 6 illustrates an example, wherein the CE configuration is based on the PL estimation. PL-based configuration may be for example for transmission of Msg3 spectral shaping and/or type A repetition factors for CE UE 110. BS 120 may for example choose a spectral shaping factor based on PL measurements considering RSRP, provided for example by ss-PBCH-BlockPower power block for all CE enabled and/or supporting UEs.

At step 610, BS 120 may broadcast a message, such as SSB, comprising a mapping table for determination of the CE configuration based on PL by CE UE 110. The message may be broadcasted via higher layer signaling (e.g., SIB1 a.k.a. RMSI). An example of the PL mapping table is shown in Table 3. Table 3 shows PL value ranges, thresholds (85 dB, 90 dB and 95 dB) and corresponding spectral sharing factors.

TABLE 3

An example of a PL value mapping table

| PL value ranges | CE conf. (SS Factor) |
|---|---|
| PL > 95 dB | $S_1$ |
| PL > 90 dB | $S_2$ |
| PL > 85 dB | $S_3$ |

At step 620, BS 120 may broadcast another message, such as SIBx and/or RMSI. Said another message may be broadcasted for association of Physical Random Access Channel, PRACH, resources, e.g., preambles and/or RACH Occasions, ROs, to specific ranges of PL values. Said association may be conveyed in a new element defined in SIBx.

Upon receiving the messages, CE UE 110 may measure RSRP of the received signals and calculate the PL, e.g., via SSB and SIB2. For instance, the PL may be calculated based a higher layer filter configuration, as defined in 3GPP TS 38.331 or referenceSignalPower as provided by ss-PBCH-BlockPower in SIB1 (3GPP TS 38.213 Section 7.4). In some embodiments, CE UE 110 may calculate the PL using the following equation (1)

$$PL_{UE}[dBm] = (referenceSignalPower) - (RSRP \text{ measurement at } UE), \quad (1)$$

where RSRP measurement at CE UE 110 is a higher layer filtered RSRP [dBm].

CE UE 110 may select a preamble for a first RA request message of a RA procedure, such as PRACH Msg1 preamble, based on the broadcast configuration provided by BS 120 at step 610. At step 630, CE UE 110 may transmit the first RA message comprising the preamble. Based at least on the selected preamble, and on the RO used to transmit it, BS 120 may extract the following information upon detection/reception:

RO #, beam #, Preamble ID.

RSRP, P_CMAX (3GPP TS 38.321)

It should be noted that a transmit beam of CE UE 110 may impact PL measurements in both uplink and downlink equally. Such gain/beam mapping does not need to be fully known at BS 120 though.

BS 120 may estimate the PL based on the received first RA request message. The CE configuration, such as spectral shaping factor and/or number of repetitions, may be configured based on the PL mapping table broadcasted at step 610, the received preamble and/or the RO over which the preamble has been received. CE UE 110 may select a PL value range to which the PL belongs to by comparing the PL value to at least one threshold, shown in Table 3.

In some embodiments, BS 120 may also use an estimation of the signal transmission propagation delay of the first RA request message, such as Msg1, to further refine the CE configuration of CE UE 110, e.g., the number of Msg3 repetitions and/or spectral shaping factor. For instance, the configuration of PRACH resources for signaling estimated PL at CE UE 110 may be done in a conservative way, such that fewer resources are reserved for this application and only coarser information is available at BS 120 on the actual PL measured at CE UE 110, e.g., a range of values in dB (3, 5, 10 and so on).

Estimated PL at BS 120 may be calculated as follows:

$$\text{Estimated } PL_{BS} = P_{PRACH} - UL\ RSRP$$

The signal transmission propagation delay, corresponding to the TA value, of the first RA request message may be used to refine the actual downlink PL estimation performed at BS 120 based on the PRACH resource used by CE UE 110 for the first RA request message. This may come either in the form of a reduction of the possible downlink PL values, or an actual fine estimation of the downlink PL itself.

BS 120 may determine the CE configuration, i.e., define the spectral shaping factor and/or number of repetitions, required and schedule the resources for transmission of the second RA request correspondingly. If neither BS 120 nor CE UE 110 PL is above the thresholds defined in the mapping table, i.e., in SIB1, BS 120 may no longer allocate resources for transmission of the second RA message, i.e., for Msg3 spectrum shaping/repetitions.

At step 640, BS 120 may transmit a RA response of the RA procedure. Upon receiving the RA response, CE UE 110 may select a CE configuration using the estimated PL, for example using Table 3. That is, CE UE 110 may select one PL value range to which the estimated PL belongs to by comparing the estimated PL value to at least one threshold. At step 650, CE UE 110 may transmit a second RA request message of the RA procedure using the selected CE configuration. Responsive to receiving the second RA message, BS 120 may transmit, at step 660, a contention resolution message to CE UE 110.

Thus, a method may comprise selecting, by UE 110, a coverage enhancement configuration using the path loss estimated by UE 110 and transmitting, by UE 110, at least one message to wireless network node, such as BS 120, using the selected coverage enhancement configuration. Another method may comprise, selecting, by a wireless network node, such as BS 120, a coverage enhancement configuration for UE 110 using the path loss estimated by the wireless network node and receiving, by the wireless network node, at least one message from UE 110 according to the selected coverage enhancement configuration. As discussed above, PL and TA may be two examples of one or more parameters affected by environment and/or radio conditions based on which coverage enhancement configuration may be selected.

Both embodiments, the TA and PL estimation-based, may be independent of how the thresholds are defined. If for example SIB1 is used to provide the mapping table comprising TA value ranges and corresponding CE configurations, e.g., for transmission of the second RA message or suitable PRACH resources, different spectral shaping factor and/or repetition numbers may be assigned. Both embodiments may be used to provide a dynamic ON/OFF feature via the RA response to configure and control the use of the CE feature(s) dynamically.

Configuration based on a TA value may outperform the PL-based configuration at least when operating on FR2, where more directive beams may be used and PL measurements may depend on UE's orientation. Big error margins may be thus observed for PL estimation on FR2. Use of the TA value does not cause any ambiguity between BS 120 and CE UE 110 compared to the PL-based method.

The threshold and shared knowledge based CE feature configuration may be used to help the network to achieve a more efficient use of spectral resources and to increase spectral efficiency, especially if the network does not need to operate in conservative mode and reserve resources which could accommodate the maximum spectral shaping factor and/or repetition number, i.e., in case CE UE 112 is present and wants/needs to use these resources. These improvements related to spectral efficiency hold regardless of the available information at BS 120 concerning CE capabilities of the UEs performing RA. Albeit that RANI has recently decided that the network can distinguish legacy UEs from CE UEs during RA, this may be solved using preamble subgrouping.

Embodiments of the present invention make it possible to schedule CE feature(s) via implicit mechanisms based on the shared knowledge. This yields overhead reduction for the signaling, without compromising flexibility of the signaling itself. Also, spectral efficiency may be increased. For instance, BS 120 does not need to allocate the resources accounting for widest possible spectral shaping factor and/or maximum spectral extension. Embodiments of the present invention are also applicable to any FDSS scheme, with or without extension, and repetition schemes. In addition, easy extension of activation/configuration is enabled, possibly to combine more than one single CE feature.

Figure 7:
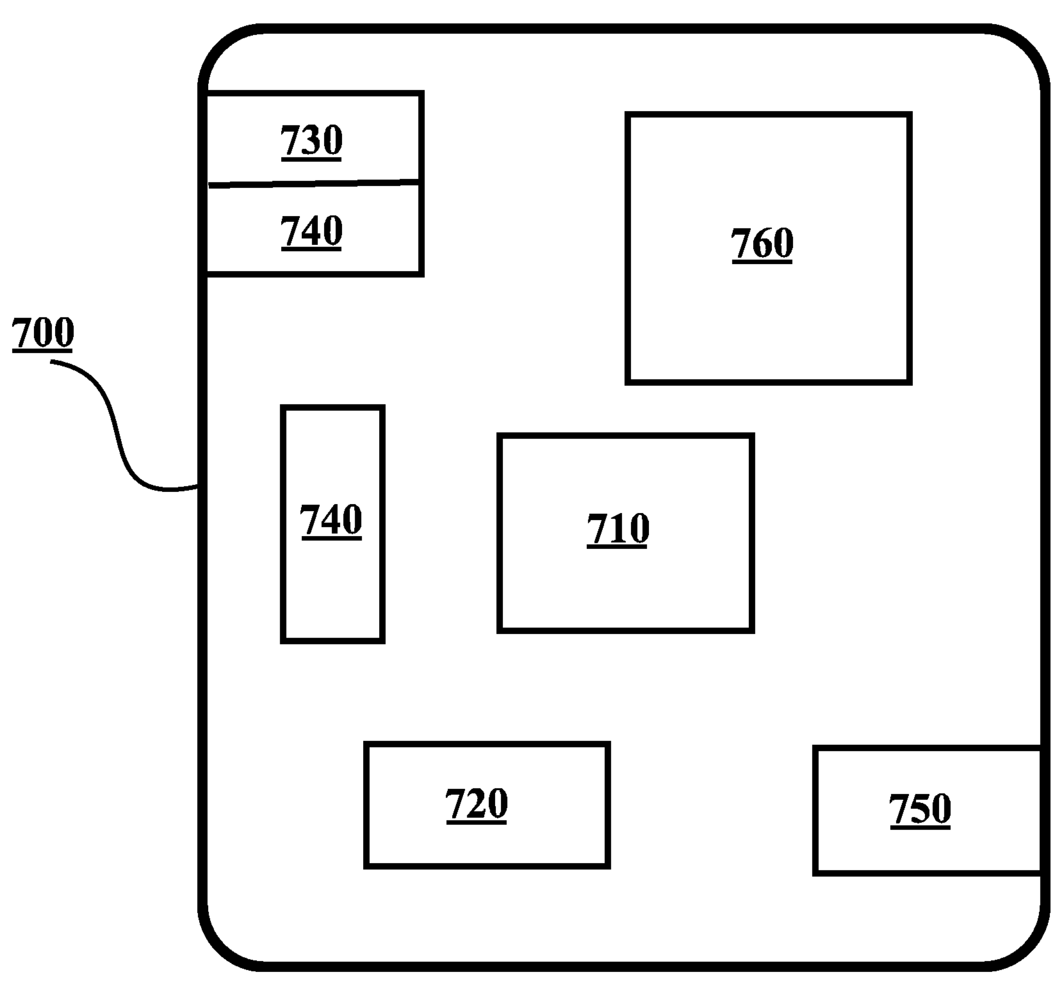
FIG. 7 illustrates an example apparatus capable of supporting at least some embodiments.

FIG. 7 illustrates an example apparatus capable of supporting at least some embodiments. Illustrated is device 700, which may be referred to as, for example, CE UE 110 or BE 120, or a control device configured to control thereof. Comprised in device 700 is processor 710, which may comprise, for example, a single- or multi-core processor wherein a single-core processor comprises one processing core and a multi-core processor comprises more than one processing core. Processor 710 may comprise, in general, a control device. Processor 710 may comprise more than one processor. Processor 710 may be a control device. A processing core may comprise, for example, a Cortex-A8 processing core manufactured by ARM Holdings or a Steamroller processing core produced by Advanced Micro Devices Corporation. Processor 710 may comprise at least one Qualcomm Snapdragon and/or Intel Atom processor. Processor 710 may comprise at least one Application-Specific Integrated Circuit, ASIC. Processor 710 may comprise at least one Field-Programmable Gate Array, FPGA. Processor 710 may be means for performing method steps in device 700. Processor 710 may be configured, at least in part by computer instructions, to perform actions.

A processor may comprise circuitry, or be constituted as circuitry or circuitries, the circuitry or circuitries being configured to perform phases of methods in accordance with embodiments described herein. As used in this application, the term "circuitry" may refer to one or more or all of the following: (a) hardware-only circuit implementations, such as implementations in only analog and/or digital circuitry, and (b) combinations of hardware circuits and software, such as, as applicable: (i) a combination of analog and/or digital hardware circuit(s) with software/firmware and (ii) any portions of hardware processor(s) with software (including digital signal processor(s)), software, and memory(ies) that work together to cause an apparatus, such as UE 110, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Device 700 may comprise memory 720. Memory 720 may comprise random-access memory and/or permanent memory. Memory 720 may comprise at least one RAM chip. Memory 720 may comprise solid-state, magnetic, optical and/or holographic memory, for example. Memory 720 may be at least in part accessible to processor 710. Memory 720 may be at least in part comprised in processor 710. Memory 720 may be means for storing information. Memory 720 may comprise computer instructions that processor 710 is configured to execute. When computer instructions configured to cause processor 710 to perform certain actions are stored in memory 720, and device 700 overall is configured to run under the direction of processor 710 using computer instructions from memory 720, processor 710 and/or its at least one processing core may be considered to be configured to perform said certain actions. Memory 720 may be at least in part comprised in processor 710. Memory 720 may be at least in part external to device 700 but accessible to device 700.

Device 700 may comprise a transmitter 730. Device 700 may comprise a receiver 740. Transmitter 730 and receiver 740 may be configured to transmit and receive, respectively, information in accordance with at least one cellular or non-cellular standard. Transmitter 730 may comprise more than one transmitter. Receiver 740 may comprise more than one receiver. Transmitter 730 and/or receiver 740 may be configured to operate in accordance with Global System for Mobile Communication, GSM, Wideband Code Division Multiple Access, WCDMA, 5G/NR, Long Term Evolution, LTE, IS-95, Wireless Local Area Network, WLAN, Ethernet and/or Worldwide Interoperability for Microwave Access, WiMAX, standards, for example.

Device 700 may comprise a Near-Field Communication, NFC, transceiver 750. NFC transceiver 750 may support at least one NFC technology, such as NFC, Bluetooth, Wibree or similar technologies.

Device 700 may comprise User Interface, UI, 760. UI 760 may comprise at least one of a display, a keyboard, a touchscreen, a vibrator arranged to signal to a user by causing device 700 to vibrate, a speaker and a microphone. A user may be able to operate device 700 via UI 760, for example to accept incoming telephone calls, to originate telephone calls or video calls, to browse the Internet, to manage digital files stored in memory 720 or on a cloud accessible via transmitter 730 and receiver 740, or via NFC transceiver 750, and/or to play games.

Device 700 may comprise or be arranged to accept a user identity module 770. User identity module 770 may comprise, for example, a Subscriber Identity Module, SIM, card installable in device 700. A user identity module 770 may comprise information identifying a subscription of a user of device 700. A user identity module 770 may comprise cryptographic information usable to verify the identity of a user of device 700 and/or to facilitate encryption of communicated information and billing of the user of device 700 for communication effected via device 700.

Processor 710 may be furnished with a transmitter arranged to output information from processor 710, via electrical leads internal to device 700, to other devices comprised in device 700. Such a transmitter may comprise a serial bus transmitter arranged to, for example, output information via at least one electrical lead to memory 720 for storage therein. Alternatively to a serial bus, the transmitter may comprise a parallel bus transmitter. Likewise processor 710 may comprise a receiver arranged to receive information in processor 710, via electrical leads internal to device 700, from other devices comprised in device 700. Such a receiver may comprise a serial bus receiver arranged to, for example, receive information via at least one electrical lead from receiver 740 for processing in processor 710. Alternatively to a serial bus, the receiver may comprise a parallel bus receiver.

Device 700 may comprise further devices not illustrated in FIG. 7. For example, where device 700 comprises a smartphone, it may comprise at least one digital camera. Some devices 700 may comprise a back-facing camera and a front-facing camera, wherein the back-facing camera may be intended for digital photography and the front-facing camera for video telephony. Device 700 may comprise a fingerprint sensor arranged to authenticate, at least in part, a user of device 700. In some embodiments, device 700 lacks at least one device described above. For example, some devices 700 may lack a NFC transceiver 750 and/or user identity module 770.

Processor 710, memory 720, transmitter 730, receiver 740, NFC transceiver 750, UI 760 and/or user identity module 770 may be interconnected by electrical leads internal to device 700 in a multitude of different ways. For example, each of the aforementioned devices may be separately connected to a master bus internal to device 700, to allow for the devices to exchange information. However, as the skilled person will appreciate, this is only one example and depending on the embodiment various ways of interconnecting at least two of the aforementioned devices may be selected without departing from the scope of the present invention.

Figure 8:
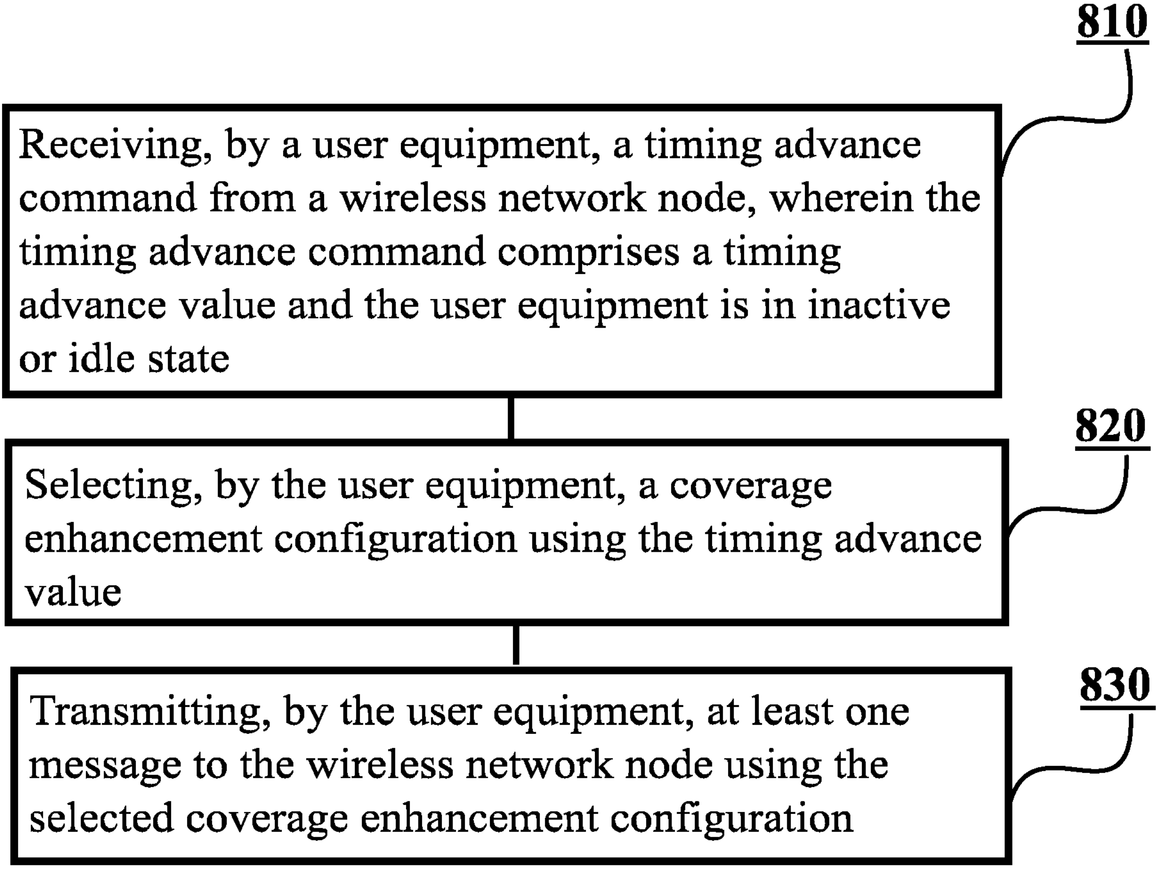
FIG. 8 illustrates a flow graph of a first method in accordance with at least some embodiments.

FIG. 8 is a flow graph of a first method in accordance with at least some example embodiments. The phases of the illustrated first method may be performed by CE UE 110 or by a control device configured to control the functioning thereof, possibly when installed therein.

The first method may comprise, at step 810, receiving, by a user equipment, a timing advance command from a wireless network node, wherein the timing advance command comprises a timing advance value and the user equipment is in an inactive or idle state. The first method may also comprise, at step 820, selecting, by the user equipment, a coverage enhancement configuration using the timing advance value. Finally, the first method may comprise, at step 830, transmitting, by the user equipment, at least one message to the wireless network node using the selected coverage enhancement configuration.

Figure 9:
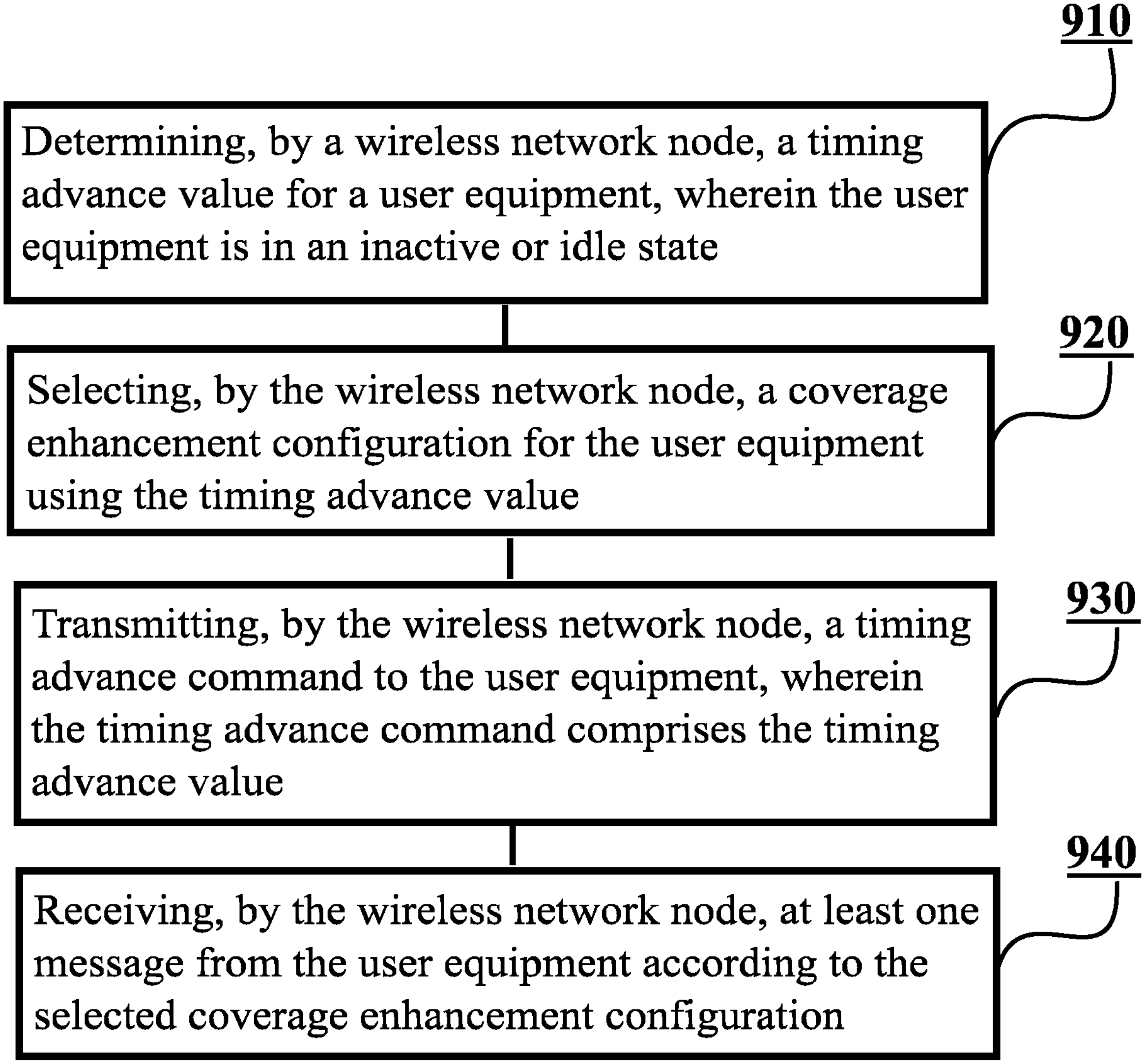
FIG. 9 illustrates a flow graph of a second method in accordance with at least some embodiments.

FIG. 9 is a flow graph of a second method in accordance with at least some example embodiments. The phases of the illustrated first method may be performed by a wireless network node, such as BS 120, or by a control device configured to control the functioning thereof, possibly when installed therein.

The second method may comprise, at step 910, determining, by a wireless network node, a timing advance value for a user equipment, wherein the user equipment is in an inactive or idle state. The second method may also comprise, at step 920, selecting, by the wireless network node, a coverage enhancement configuration for the user equipment using the timing advance value. In addition, the second method may comprise, at step 930, transmitting, by the wireless network node, a timing advance command to the user equipment, wherein the timing advance command comprises the timing advance value. Finally, the second method may comprise, at step 940, receiving, by the wireless network node, at least one message from the user equipment according to the selected coverage enhancement configuration.

It is to be understood that the embodiments disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment. Thus, appearances of the phrases “in one embodiment” or “in an embodiment” in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and examples may be referred to herein along with alternatives for the various components thereof. It is understood that such embodiments, examples, and alternatives are not to be construed as de facto equivalents of one another, but are to be considered as separate and autonomous representations.

In an exemplary embodiment, an apparatus, such as, for example, UE 110 or BS 120, or a control device configured to control thereof, may comprise means for carrying out the embodiments described above and any combination thereof.

In an exemplary embodiment, a computer program may be configured to cause a method in accordance with the embodiments described above and any combination thereof. In an exemplary embodiment, a computer program product, embodied on a non-transitory computer readable medium, may be configured to control a processor to perform a process comprising the embodiments described above and any combination thereof.

In an exemplary embodiment, an apparatus, such as, for example, UE 110 or BS 120, or a control device configured to control thereof, may comprise at least one processor, and at least one memory including computer program code, wherein the at least one memory and the computer program code are configured to, with the at least one processor, cause the apparatus at least to perform the embodiments described above and any combination thereof.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the embodiments in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in cellular communication networks, wherein it is desirable to perform coverage enhancements.

ACRONYMS LIST

3GPP 3rd Generation Partnership Project
ASIC Application-Specific Integrated Circuit
BS Base Station
CE Coverage Enhancement
D2D Device-to-Device
DU Distributed Unit
FDSS Frequency Domain Spectral Shaping
FPGA Field-Programmable Gate Array
FR Frequency Range
GSM Global System for Mobile communication
IAB Integrated Access and Backhaul
IoT Internet of Things
LTE Long-Term Evolution
M2M Machine-to-Machine
MT Mobile Termination
NFC Near-Field Communication
NR New Radio
PAPR Peak-to-Average Power Ratio
PL Path Loss
PBCH Physical Broadcast Channel
PRACH Physical RACH
PRB Physical Resource Block
QAM Quadrature Amplitude Modulation
QPSK Quadrature PSK
RA Random Access
RACH RA Channel
RAN Radio Access Network
RAT Radio Access Technology
RMSI Remaining Minimum System Information
RO RACH Occasion
RRC Radio Resource Control
RSRP Reference Signal Received Power
SIB System Information Block
SIM Subscriber Identity Module
SS Spectral Shaping
SSB Synchronization Signal Block
TA Timing Advance
TAC TA Command
UE User Equipment
UI User Interface
WCDMA Wideband Code Division Multiple Access
WiMAX Worldwide Interoperability for Microwave Access
WLAN Wireless Local Area Network

REFERENCE SIGNS LIST

| | |
|---|---|
| 110, 112 | User Equipment |
| 115, 125, 135 | Interfaces |
| 120 | Base Station |
| 130 | Core network |
| 150 | Threshold |
| 210, 310, 410 | Necessary resources for CE UE 110 |
| 220 | Wasted resources |
| 320, 420 | Saved resources |
| 330 | Resources allocated for UE 112 |
| 510-550 | Steps in FIG. 5 |
| 610-660 | Steps in FIG. 6 |
| 710-770 | Structure of the apparatus of FIG. 7 |
| 810-830 | Phases of the first method in FIG. 8 |
| 910-940 | Phases of the second method in FIG. 9 |

The invention claimed is:

1. A user equipment (UE) operating in a 5G New Radio (NR) Frequency Range 2 (FR2) cell and in RRC_INACTIVE during a random access (RA) procedure, the UE comprising:

at least one processor; and at least one memory comprising computer program code that, when executed by the processor, cause the apparatus to perform the following operations:

prior to initiation of the RA procedure, receiving, via System Information Block 1 (SIB1), a mapping table that associates timing-advance (TA) ranges expressed in units of Tc=0.509 nanosecond with coverage-enhancement (CE) configurations, the mapping table consisting of exactly two TA ranges: (A) $TA<1100\cdot Tc$ mapped to a configuration that disables spectrum shaping and (B) $TA\geq 1100\cdot Tc$ mapped to frequency-domain spectrum shaping with symmetric extension having an extension factor $\alpha=0.25$;

receiving a TA command from a wireless network node, wherein the TA command is included in a random access response (Msg2) and includes a TA value expressed in Tc units while the UE is in RRC_INACTIVE state;

selecting a coverage enhancement configuration solely from the received TA value and the stored mapping table without using any path-loss estimation and without any additional per-UE signaling; and transmitting at least one message to the wireless network node using the selected coverage enhancement configuration, wherein the at least one message is a second RA request (Msg3) comprising a radio resource control (RRC) connection request transmitted on uplink resources indicated in Msg2 using the selected frequency-domain spectrum shaping with the symmetric extension factor $\alpha=0.25$ and with no time-domain repetition of Msg3.

2. The UE of claim 1, wherein the mapping table is delivered as Remaining Minimum System Information (RMSI) via a Physical Broadcast Channel (PBCH) transmission of System Information Block 1 (SIB1), and the UE stores the mapping table in memory prior to initiation of the random access procedure.

3. The UE of claim 2 wherein the symmetric extension having an extension factor $\alpha=0.25$" increases a nominal Msg3 frequency-domain allocation from NtxN_{tx}Ntx resource blocks to (1+0.25)·Ntx(1+0.25)\cdot N_{tx}(1+

0.25)·Ntx resource blocks, and Msg3 is transmitted in a single uplink slot without any time-domain repetition.

4. The UE of claim 3, wherein the selection of the coverage-enhancement configuration is performed without using any path-loss estimate and further disregards any PRACH preamble-to-path-loss association signaled in any SIBx message.

5. The UE of claim 4, wherein the UE applies the selected coverage-enhancement configuration solely based on the TA value and the stored mapping table without requiring any CE-specific field in the random access response (Msg2) other than the timing advance value and an uplink grant, thereby operating with an unmodified Msg2 format.

6. The UE of claim 5, wherein the UE applies the selected frequency-domain spectrum shaping with the extension factor α=0.25 only to the second random access request (Msg3) and refrains from applying any spectrum shaping or repetition to subsequent uplink transmissions prior to contention resolution.

7. The UE of claim 6, further comprising receiving, after transmitting Msg3, a contention-resolution message of the random access procedure from the wireless network node.

8. A system comprising:

a user equipment (UE) operating in a 5G New Radio (NR) Frequency Range 2 (FR2) cell and in RRC_INACTIVE during a random access (RA) procedure:

at least one processor; and at least one memory comprising computer program code that, when executed by the processor, cause the apparatus to perform the following operations:

prior to initiation of the RA procedure, receiving, via System Information Block 1 (SIB1), a mapping table that associates timing-advance (TA) ranges expressed in units of Tc=0.509 nanosecond with coverage-enhancement (CE) configurations, the mapping table consisting of exactly two TA ranges: (A) TA<1100·Tc mapped to a configuration that disables spectrum shaping and (B) TA≥1100·Tc mapped to frequency-domain spectrum shaping with symmetric extension having an extension factor α=0.25;

receiving a TA command from a wireless network node, wherein the TA command is included in a random access response (Msg2) and includes a TA value expressed in Tc units while the UE is in RRC_INACTIVE state;

selecting a coverage enhancement configuration solely from the received TA value and the stored mapping table without using any path-loss estimation and without any additional per-UE signaling; and transmitting at least one message to the wireless network node using the selected coverage enhancement configuration, wherein the at least one message is a second RA request (Msg3) comprising a radio resource control (RRC) connection request transmitted on uplink resources indicated in Msg2 using the selected frequency-domain spectrum shaping with the symmetric extension factor α=0.25 and with no time-domain repetition of Msg3.

9. The system of claim 8, wherein the mapping table is delivered as Remaining Minimum System Information (RMSI) via a Physical Broadcast Channel (PBCH) transmission of System Information Block 1 (SIB1), and the UE stores the mapping table in memory prior to initiation of the random access procedure.

10. The system of claim 9 wherein the symmetric extension having an extension factor α=0.25" increases a nominal Msg3 frequency-domain allocation from NtxN_{tx}Ntx resource blocks to (1+0.25)·Ntx (1+0.25)\cdot N_{tx}(1+0.25)·Ntx resource blocks, and Msg3 is transmitted in a single uplink slot without any time-domain repetition.

11. The system of claim 10, wherein the selection of the coverage-enhancement configuration is performed without using any path-loss estimate and further disregards any PRACH preamble-to-path-loss association signaled in any SIBx message.

12. The system of claim 11, wherein the UE applies the selected coverage-enhancement configuration solely based on the TA value and the stored mapping table without requiring any CE-specific field in the random access response (Msg2) other than the timing advance value and an uplink grant, thereby operating with an unmodified Msg2 format.

13. The system of claim 12, wherein the UE applies the selected frequency-domain spectrum shaping with the extension factor α=0.25 only to the second random access request (Msg3) and refrains from applying any spectrum shaping or repetition to subsequent uplink transmissions prior to contention resolution.

14. The system of claim 13, further comprising receiving, after transmitting Msg3, a contention-resolution message of the random access procedure from the wireless network node.

15. A method performed by a user equipment (UE) operating in a 5G New Radio (NR) Frequency Range 2 (FR2) cell and in RRC_INACTIVE during a random access (RA) procedure, the method comprising:

prior to initiation of the RA procedure, receiving, via System Information Block 1 (SIB1), a mapping table that associates timing-advance (TA) ranges expressed in units of Tc=0.509 nanosecond with coverage-enhancement (CE) configurations, the mapping table consisting of exactly two TA ranges: (A) TA<1100·Tc mapped to a configuration that disables spectrum shaping and (B) TA≥1100·Tc mapped to frequency-domain spectrum shaping with symmetric extension having an extension factor α=0.25;

receiving a TA command from a wireless network node, wherein the TA command is included in a random access response (Msg2) and includes a TA value expressed in Tc units while the UE is in RRC_INACTIVE state;

selecting a coverage enhancement configuration solely from the received TA value and the stored mapping table without using any path-loss estimation and without any additional per-UE signaling; and transmitting at least one message to the wireless network node using the selected coverage enhancement configuration, wherein the at least one message is a second RA request (Msg3) comprising a radio resource control (RRC) connection request transmitted on uplink resources indicated in Msg2 using the selected frequency-domain spectrum shaping with the symmetric extension factor α=0.25 and with no time-domain repetition of Msg3.

16. The method of claim 15, wherein the mapping table is delivered as Remaining Minimum System Information (RMSI) via a Physical Broadcast Channel (PBCH) transmission of System Information Block 1 (SIB1), and the UE stores the mapping table in memory prior to initiation of the random access procedure.

17. The method of claim 16 wherein the symmetric extension having an extension factor α=0.25" increases a nominal Msg3 frequency-domain allocation from NtxN_{tx}Ntx resource blocks to (1+0.25)·Ntx(1+0.25) \cdot N_{tx}(1+0.25)·Ntx resource blocks, and Msg3 is transmitted in a single uplink slot without any time-domain repetition.

18. The method of claim 17, wherein the selection of the coverage-enhancement configuration is performed without using any path-loss estimate and further disregards any PRACH preamble-to-path-loss association signaled in any SIBx message.

19. The method of claim 18, wherein the UE applies the selected coverage-enhancement configuration solely based on the TA value and the stored mapping table without requiring any CE-specific field in the random access response (Msg2) other than the timing advance value and an uplink grant, thereby operating with an unmodified Msg2 format.

20. The method of claim 19, wherein the UE applies the selected frequency-domain spectrum shaping with the extension factor $\alpha=0.25$ only to the second random access request (Msg3) and refrains from applying any spectrum shaping or repetition to subsequent uplink transmissions prior to contention resolution.

* * * * *